United States Patent
Day et al.

(10) Patent No.: US 7,531,260 B2
(45) Date of Patent: May 12, 2009

(54) SOLID OXIDE FUEL CELL COMPONENT AND A METHOD OF MANUFACTURING A SOLID OXIDE FUEL CELL COMPONENT

(75) Inventors: Michael J. Day, Waterhouses (GB); Frederick J. Gardner, Derby (GB); Mark Cassidy, Calgary (CA); Nigel Brandon, Sutton (GB); Nigel T. Hart, Derby (GB)

(73) Assignee: Rolls-Royce plc, London (GB)

( * ) Notice: Subject to any disclaimer, the term of this patent is extended or adjusted under 35 U.S.C. 154(b) by 152 days.

(21) Appl. No.: 10/405,466

(22) Filed: Apr. 3, 2003

(65) Prior Publication Data

US 2004/0076867 A1    Apr. 22, 2004

Related U.S. Application Data

(63) Continuation of application No. PCT/GB01/04410, filed on Oct. 2, 2001.

(51) Int. Cl.
*H01M 8/10* (2006.01)
*H01M 2/00* (2006.01)

(52) U.S. Cl. .................. 429/30; 429/33; 429/32; 429/34

(58) Field of Classification Search .................. 429/30, 429/12, 33
See application file for complete search history.

(56) References Cited

U.S. PATENT DOCUMENTS 3,472,701 A * 10/1969 Selover, Jr. et al. ......... 429/183
3,957,496 A * 5/1976 Eagan ........................... 501/2
4,490,444 A * 12/1984 Isenberg ....................... 429/31
4,648,945 A   3/1987 Isenberg
4,728,584 A * 3/1988 Isenberg ....................... 429/321

(Continued)

FOREIGN PATENT DOCUMENTS

EP         0275356 A        7/1988

(Continued)

OTHER PUBLICATIONS

Jess Stein, Random House Dictionary, 1980, Revised, Section O.*

*Primary Examiner*—Patrick Ryan
*Assistant Examiner*—Helen O. K. Chu
(74) *Attorney, Agent, or Firm*—W. Warren Taltavull; Manelli Denison & Selter PLLC

(57) ABSTRACT

A solid oxide fuel cell component (12) comprises a plurality of solid oxide fuel cells (24) arranged in spaced apart relationship, and in electrical series, on a surface of the porous gas permeable support structure (16). Each solid oxide fuel cell (24) comprises a dense gas tight electrolyte member (28), a porous gas permeable first electrode (26) and a porous gas permeable second electrode (30). Each electrolyte (28) is arranged in contact with a corresponding one of the first electrodes (26), each second electrode (30) is arranged in contact with a corresponding one of the electrolytes (28). Each of the first electrodes (26) is arranged in contact with the surface of the support structure (16). The interconnectors (32), the peripheral seal layer (34) and the electrolytes (28) are arranged to encapsulate all of the first electrodes (26) except for the surfaces of the first electrodes (26) in contact with the surface of the support structure (16) to prevent leakage of reactant from the first electrodes (16).

39 Claims, 7 Drawing Sheets

U.S. PATENT DOCUMENTS

| | | | |
|---|---|---|---|
| 5,045,169 A * | 9/1991 | Feduska et al. | 204/258 |
| 5,190,834 A * | 3/1993 | Kendall | 429/31 |
| 5,397,657 A | 3/1995 | Ito et al. | |
| 5,863,672 A * | 1/1999 | Ledjeff et al. | 429/26 |

FOREIGN PATENT DOCUMENTS

| | | | |
|---|---|---|---|
| EP | 0426265 A | | 5/1991 |
| EP | 0642185 A | | 3/1995 |
| JP | 0426265 A2 | * | 9/1990 |
| JP | 0642185 | * | 8/1994 |
| WO | WO 0077872 A | | 12/2000 |

* cited by examiner

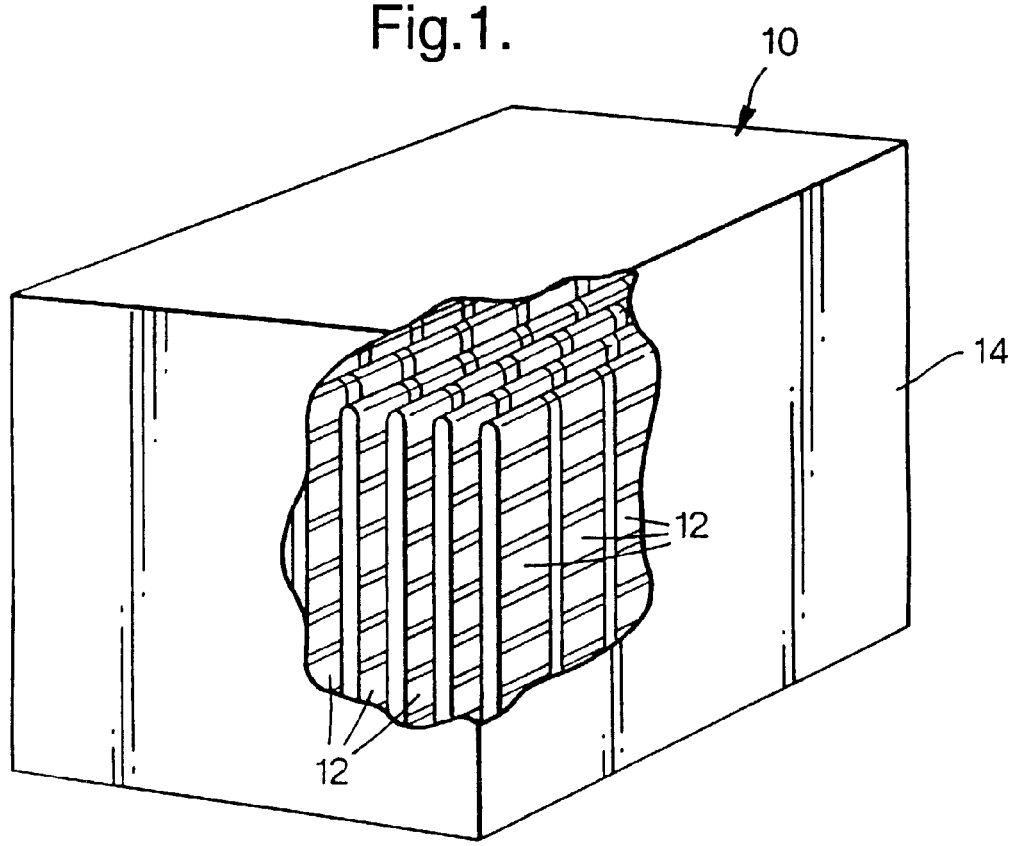
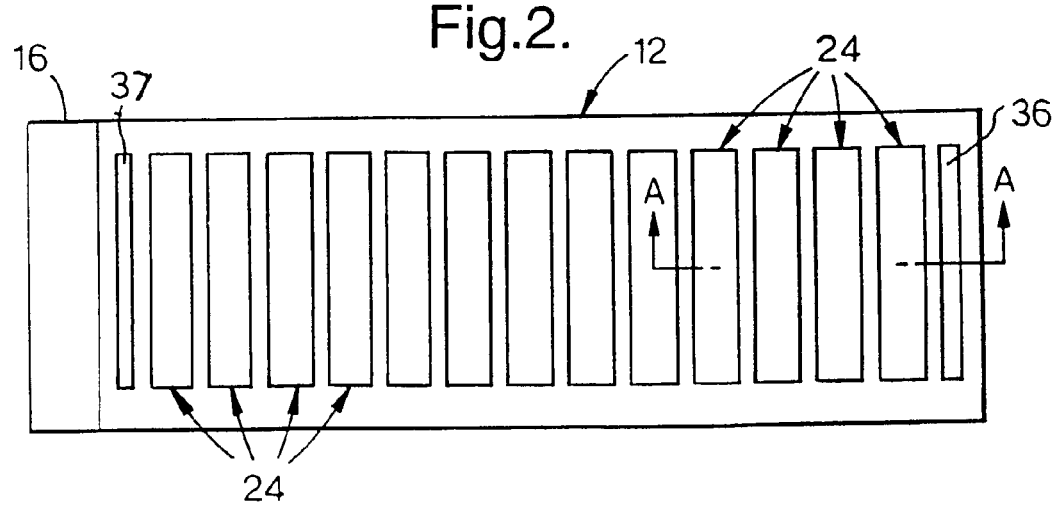

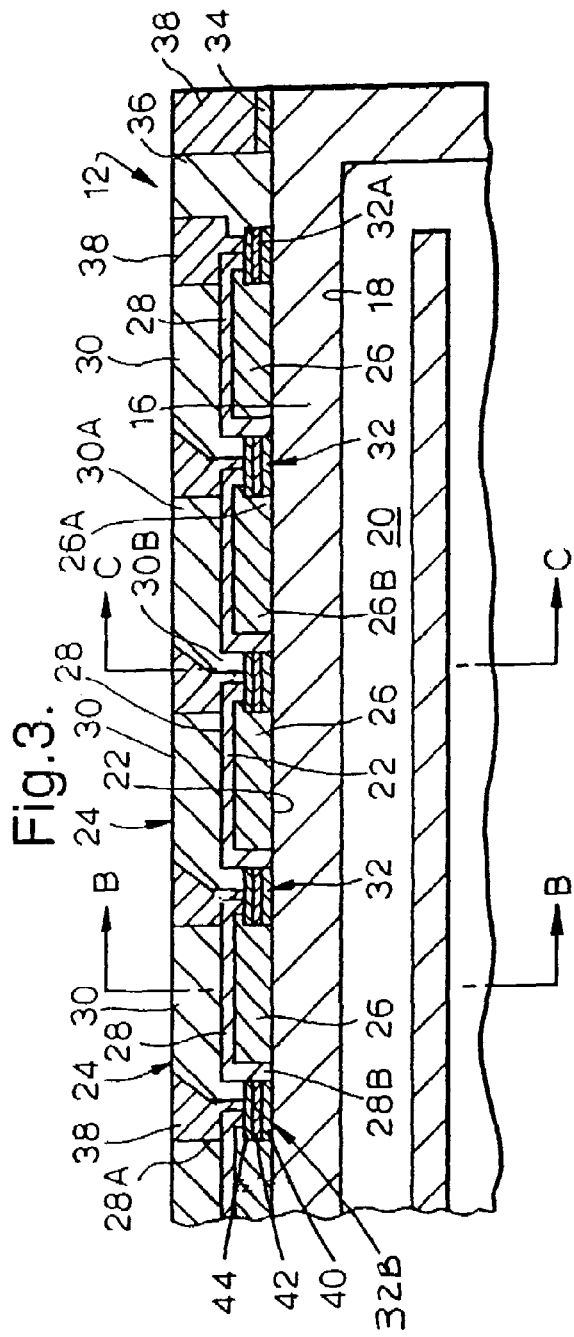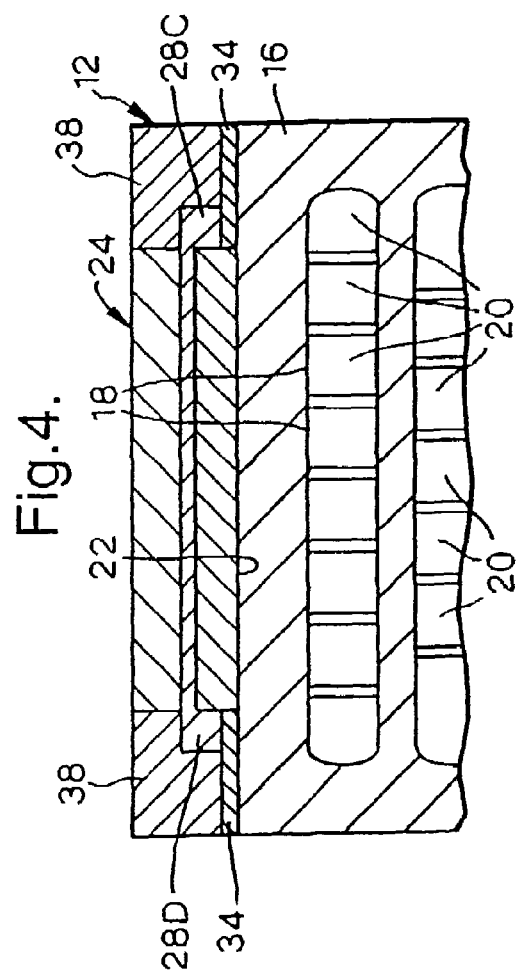

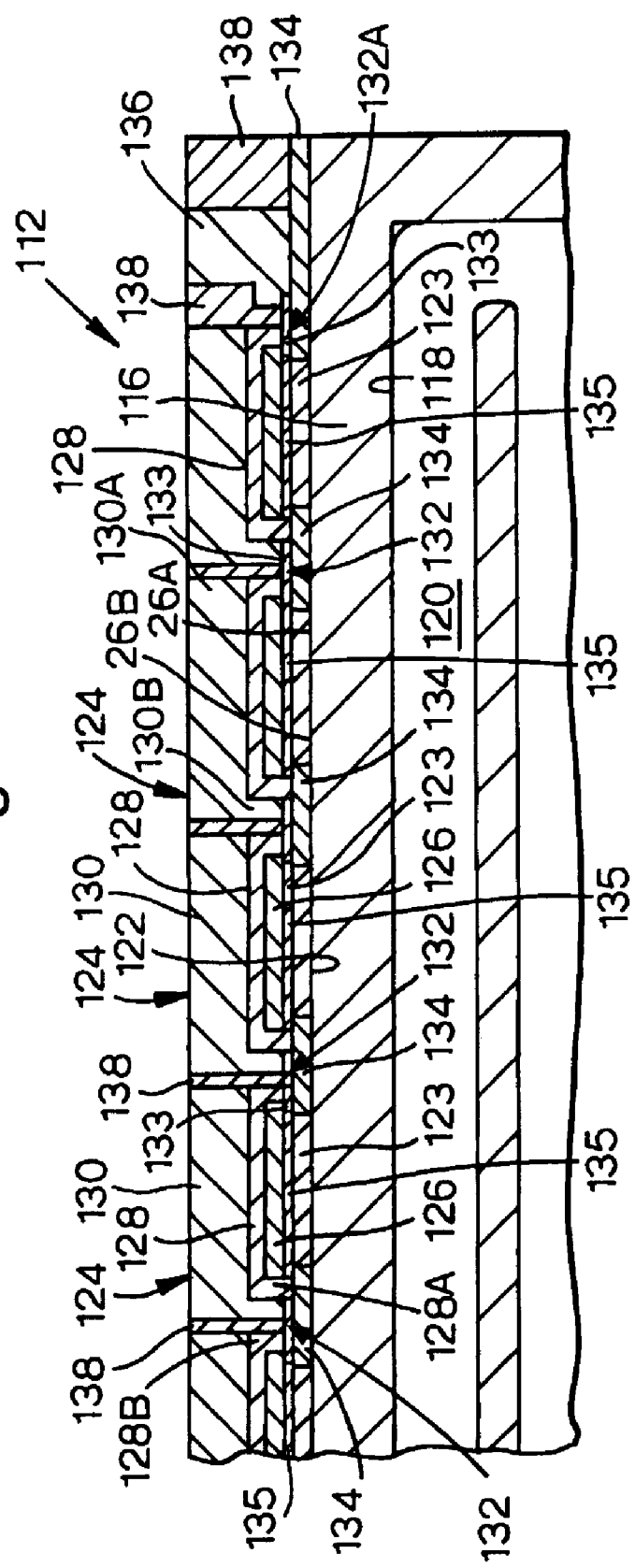

SOLID OXIDE FUEL CELL COMPONENT AND A METHOD OF MANUFACTURING A SOLID OXIDE FUEL CELL COMPONENT

This is a Continuation of: International Appln. No. PCT/GB 01/04410 filed Oct. 2, 2001.

FIELD OF THE INVENTION

The present invention relates to a solid oxide fuel cell component and in particular relates to a planar solid oxide fuel cell component.

BACKGROUND OF THE INVENTION

One known planar solid oxide fuel cell stack is described in European patent applications EP0668622A1 and EP0673074A1. These describe a planar solid oxide fuel cell stack comprising a plurality of solid oxide electrolyte members, each solid oxide electrolyte member having an anode electrode on a first surface and a cathode electrode on a second opposite surface to form a fuel cell. At least one interconnector is provided to connect the anode electrode of one fuel cell with the cathode electrode of an adjacent fuel cell such that the solid oxide fuel cells are connected in electrical series. The fuel cells are arranged in a plane on one or both sides of a hollow porous gas permeable support/distribution member, which supplies either fuel to the anode electrodes or oxidant to the cathode electrodes. The electrolytes of these solid oxide fuel cells are of the order of 1 $\mu$m to 50 $\mu$m, for example 10 $\mu$m.

The main problems with all solid oxide fuel cells are the high manufacturing costs, poor thermal expansion compliance and limited operational temperature range. The poor thermal expansion compliance of solid oxide fuel cells makes them intolerant to temperature differences and to thermal shocks.

A further problem with all solid oxide fuel cells is that the voltages are less than the Nernst value due to electrochemical and electrical losses in the fuel cells. These losses depend on the current density. The losses are due to activation in the electrodes, diffusion in the electrodes and porous gas permeable support member, electrolyte/electrode interfacial resistance, current collection in the electrodes and ionic resistance in the electrolyte. The activation losses dominate at low currents, the diffusion losses dominate at high currents and the resistive losses dominate at intermediate and high currents. Losses also arise due to current flow through the interconnectors.

Also leakage losses through the electrolyte, interconnectors, and around the periphery of the fuel cells gives rise to further losses. Voids and micro cracks through the components or leakage around the periphery of the components impair the electrochemical performance of the fuel cells in three respects. Firstly there is a loss of current by diffusion or leakage of fuel or oxygen. Secondly there is a loss of voltage due to reduced oxygen partial pressure difference across the electrolyte membrane of the fuel cell. Thirdly there is increased resistance in the anode electrodes due to the nickel electrodes becoming oxidised to nickel oxide.

Other losses may arise due to oxygen ion leakage currents in the interconnectors and in the support member, if these posses ionic conductivity. Further losses may arise due to spurious fuel cells formed between an anode of one fuel cell and the cathode of an adjacent fuel cell if the cathode of one fuel cell contacts the electrolyte of the adjacent fuel cell. The interconnector short-circuits the spurious fuel cell.

Another problem with solid oxide fuel cells is the chemical interaction between the substrate and the anode electrode.

SUMMARY OF THE INVENTION

Accordingly the present invention seeks to provide a solid oxide fuel cell component which overcomes or at least reduces the problem of leakage through and around the fuel cells.

Accordingly the present invention provides a solid oxide fuel cell component comprising a porous gas permeable support structure, a plurality of dense non-porous gas tight interconnectors, a dense non-porous gas tight peripheral seal layer and a plurality of solid oxide fuel cells, the solid oxide fuel cells are arranged in spaced apart relationship on a surface of the porous gas permeable support structure, the solid oxide fuel cells are arranged in electrical series, each solid oxide fuel cell comprises a dense non-porous gas tight electrolyte member, a porous gas permeable first electrode and a porous gas permeable second electrode, each dense non-porous gas tight electrolyte is arranged in contact with a corresponding one of the porous gas permeable first electrodes, each porous gas permeable second electrode is arranged in contact with a corresponding one of the dense non-porous gas tight electrolyte members, the dense non-porous gas tight interconnectors, the dense non-porous gas tight peripheral seal layer and the dense non-porous gas tight electrolyte members are arranged to encapsulate at least one of the porous gas permeable first electrodes except for the surface of the porous gas permeable first electrode facing the surface of the porous gas permeable support structure to reduce leakage of reactant from the at least one porous gas permeable first electrode.

Preferably the dense non-porous gas tight interconnectors, the dense non-porous gas tight peripheral seal layer and the dense non-porous gas tight electrolyte members are arranged to encapsulate all of the porous gas permeable first electrodes except for the surfaces of the porous gas permeable first electrodes facing the surface of the porous gas permeable support structure to reduce leakage of reactant from the porous gas permeable first electrodes.

Preferably the solid oxide fuel cell stack comprises a dense non-porous gas tight seal, the dense non-porous gas tight electrolyte members and the dense non-porous gas tight seal are arranged to encapsulate at least one of the porous gas permeable second electrodes except for the surface of the at least one porous gas permeable second electrode remote from the dense non-porous gas tight electrolyte members to reduce leakage of reactant from the at least one porous gas permeable second electrode.

Preferably the dense non-porous gas tight electrolyte members and the dense non-porous seal are arranged to encapsulate all the porous gas permeable second electrodes except for the surfaces of the porous gas permeable second electrodes remote from the dense non-porous gas tight electrolyte members to reduce leakage of reactant from the porous gas permeable second electrodes.

Each of the porous gas permeable first electrodes is arranged in contact with the surface of the porous gas permeable support structure.

Preferably each of the porous gas permeable first electrodes is arranged in contact with the surface of a current collector, each current collector is arranged in contact with a porous barrier layer, the porous barrier layer is arranged in contact with the surface of the porous gas permeable support structure.

Preferably the at least one interconnector comprises a first layer on the porous gas permeable support structure, a second layer on the first layer and a third layer on the second layer, the first layer is dense, non-porous and is electronically and ionically non conducting, the second layer bonds the third layer to the first layer and the third layer is electronically conducting. Preferably the first layer comprises a ceramic, the second layer comprises lanthanum chromite and the third layer comprises a metal. Preferably the third layer comprises nickel, platinum, palladium, ruthenium, silver, or an alloy two or more of the elements for example an alloy of palladium and nickel or other oxidation resistant metal. Preferably the first layer comprises yttria stabilised zirconia doped with silicate glass or yttria stabilised zirconia doped with calcium chromate such that the barrier layer is ionically non conducting.

Alternatively the at least one interconnector comprises a first layer on the porous gas permeable support structure and a second layer on the first layer, the first layer is dense, non-porous and is electronically and ionically non conducting and the second layer is electronically conducting. Preferably the first layer comprises a ceramic and the second layer comprises a metal. Preferably the second layer comprises nickel, platinum, palladium, ruthenium, silver, or an alloy of two or more of the elements for example an alloy of palladium and nickel. Preferably the first layer comprises yttria-stabilised zirconia. Preferably the first layer comprises yttria stabilised zirconia doped with silicate glass or yttria stabilised zirconia doped with calcium chromate such that the first layer is ionically non conducting.

Preferably the dense non-porous gas tight peripheral seal extends around the periphery of the area defined by the porous gas permeable first electrodes and the dense non-porous interconnectors.

Preferably the ends of the dense non-porous interconnectors overlap the dense non-porous gas tight peripheral seal. Preferably the edges of the dense non-porous gas tight electrolyte members overlap the dense non-porous gas tight peripheral seal.

Preferably the dense non-porous gas tight peripheral seal comprises a first layer and a second layer. Preferably the dense non-porous gas tight peripheral seal comprises a ceramic. Preferably the dense non-porous gas tight peripheral seal comprises yttria-stabilised zirconia. Preferably the dense non-porous gas tight peripheral seal comprises yttria stabilised zirconia doped with silicate glass or yttria stabilised zirconia doped with calcium chromate such that the dense non-porous gas tight seal is ionically non conducting.

Preferably the dense non-porous seal overlaps the dense non-porous gas tight peripheral seal. Preferably the dense non-porous seal overlaps the ends of the dense non-porous gas tight electrolytes. Preferably the dense non-porous seal overlaps the ends of the dense non-porous interconnectors. Preferably the dense non-porous seal comprises a glass ceramic material.

Preferably the porous gas permeable substrate comprises a ceramic with a thermal expansion coefficient matched to that of the dense non-porous gas tight electrolyte member. Preferably the ceramic comprises a mixture of magnesium aluminate and magnesia. Alternatively the ceramic comprises calcia-stabilised zirconia.

One end of each dense non-porous gas tight electrolyte member overlaps one of the interconnectors and the second end of each dense non-porous gas tight electrolyte member may be in sealing contact with the surface of the porous gas permeable support structure.

Preferably one end of each dense non-porous gas tight electrolyte member overlaps one of the interconnectors and the second end of each dense non-porous gas tight electrolyte member overlaps one of the interconnectors.

Preferably one end of each dense non-porous gas tight electrolyte member overlaps one of the interconnectors and the second end of each dense non-porous gas tight electrolyte member abuts one of the interconnectors.

Preferably one end of each porous gas permeable first electrode overlaps one of the interconnectors.

Alternatively the whole of each porous gas permeable first electrode overlaps one of the interconnectors.

The present invention also provides a method of manufacturing a solid oxide fuel cell component comprising a porous gas permeable support structure, a plurality of dense interconnectors, a dense non-porous gas tight peripheral seal layer and a plurality of solid oxide fuel cells, the solid oxide fuel cells are arranged in spaced apart relationship on a surface of the porous gas permeable support structure, the solid oxide fuel cells are arranged in electrical series, each solid oxide fuel cell comprises a dense non-porous gas tight electrolyte member, a porous gas permeable first electrode and a porous gas permeable second electrode, each dense non-porous gas tight electrolyte is arranged in contact with a corresponding one of the porous gas permeable first electrodes, each porous gas permeable second electrode is arranged in contact with a corresponding one of the dense non-porous gas tight electrolyte members, each of the porous gas permeable first electrodes is arranged facing the surface of the porous gas permeable support structure, the method comprising the steps of:—

(a) forming the porous gas permeable support structure, (b) depositing a plurality of dense interconnectors and a dense non-porous gas tight peripheral seal layer on the porous gas permeable support structure, (c) depositing a plurality of porous gas permeable first electrodes on the porous gas permeable support structure, (d) depositing a plurality of dense non-porous gas tight electrolyte members on the porous gas permeable first electrodes such that the dense interconnectors, the dense non peripheral seal layer and the dense non-porous gas tight electrolyte members are arranged to encapsulate at least one of the porous gas permeable first electrodes except for the surface of the porous gas permeable first electrode facing the surface of the porous gas permeable support structure to reduce leakage of reactant from the at least one porous gas permeable first electrode, (e) depositing a plurality of porous gas permeable second electrodes on the plurality of dense non-porous gas tight electrolyte members.

Preferably step (d) comprises depositing the plurality of dense non-porous gas tight electrolyte members on the porous gas permeable first electrodes such that the dense non-porous interconnectors, the dense non-porous gas tight peripheral seal layer and the dense non-porous gas tight electrolyte members are arranged to encapsulate all of the porous gas permeable first electrodes except for the surfaces of the porous gas permeable first electrodes in contact with the surface of the porous gas permeable support structure to reduce leakage of reactant from the porous gas permeable first electrodes.

Preferably the method comprises the subsequent step of:—

(f) depositing a dense non-porous seal around the plurality of porous gas permeable second electrodes such that the dense non-porous gas tight electrolytes and the dense non-porous seal encapsulate at least one of the porous gas permeable second electrodes except for the surface of the at least one porous gas permeable second electrode remote from the dense non-porous gas tight electrolyte members to reduce leakage of reactant from the at least one porous gas permeable second electrode.

Preferably step (f) comprises depositing the dense non-porous seal around the plurality of porous gas permeable second electrodes such that the dense non-porous gas tight electrolyte members and the dense non-porous seal encapsulate all the porous gas permeable second electrodes except for the surfaces of the porous gas permeable second electrodes remote from the dense non-porous gas tight electrolyte members to reduce leakage of reactant from the porous gas permeable second electrodes.

Preferably step (a) comprises depositing the dense non-porous gas tight peripheral seal such that it extends around the periphery of the area defined by the porous gas permeable first electrodes and the dense non-porous interconnectors.

Preferably step (a) comprises depositing the dense non-porous interconnectors such that they overlap the dense non-porous gas tight peripheral seal.

Preferably step (d) comprises depositing the dense non-porous gas tight electrolyte members such that they overlap the dense non-porous gas tight peripheral seal.

Preferably step (a) comprises depositing a first layer and a second layer to form the dense non-porous gas tight peripheral seal. Preferably the dense non-porous gas tight peripheral seal comprises a ceramic. Preferably the dense non-porous gas tight peripheral seal comprises yttria-stabilised zirconia.

Preferably step (f) comprises depositing the dense non-porous seal such that it overlaps the dense non-porous gas tight peripheral seal. Preferably step (f) comprises depositing the dense non-porous seal such that it overlaps the ends of the dense non-porous gas tight electrolyte members. Preferably step (f) comprises depositing the dense non-porous seal such that it overlaps the ends of the dense non-porous interconnectors.

Preferably step (d) comprises depositing the dense non-porous gas tight electrolyte members such that one end of each dense non-porous gas tight electrolyte member overlaps one of the interconnectors and the second end of each dense non-porous gas tight electrolyte member is in sealing contact with the surface of the porous gas permeable support structure.

Step (d) may comprise depositing the dense non-porous gas tight electrolyte members such that one end of each dense non-porous gas tight electrolyte member overlaps one of the interconnectors and the second end of each dense non-porous gas tight electrolyte members abut one of the interconnectors.

Alternatively step (d) may comprise depositing the dense non-porous gas tight electrolyte members such that one end of each dense non-porous gas tight electrolyte member overlaps one of the interconnectors and the second end of each dense non-porous gas tight electrolyte member overlaps one of the interconnectors.

Preferably step (c) comprises depositing the porous gas permeable first electrodes such that one edge of each porous gas permeable first electrode overlaps one of the interconnectors.

Alternatively step (c) comprises depositing the porous gas permeable first electrodes such that the whole of each porous gas permeable first electrode overlaps one of the interconnectors.

Preferably the method comprises the additional steps of:—
(g) sintering after step (d) and before step (e) and
(h) sintering after step (f).

Alternatively the method comprises the additional steps of:—
(g) sintering after step (b) and before step (c),
(h) sintering after step (d) and before step (e), and
(i) sintering after step (f).

Alternatively the method comprises the additional steps of:—
(g) sintering after step (a) and before step (b),
(h) sintering after step (b) and before step (c),
(i) sintering after step (c) and before step (d),
(j) sintering after step (d) and before step (e),
(k) sintering after step (e) and before step (f), and
(l) sintering after step (f).

BRIEF DESCRIPTION OF THE DRAWINGS

The present invention will be more fully described by way of example with reference to the accompanying drawings in which:—

FIG. 1 is a partially cut away perspective view of a solid oxide fuel cell stack according to the present invention.

FIG. 2 is a plan view of one component of the solid oxide fuel cell stack shown in FIG. 1.

FIG. 3 is an enlarged cross-sectional view along line A-A through the component of the solid oxide fuel cell stack shown in FIG. 2.

FIG. 4 is a cross-sectional view along line B-B through the component of the solid oxide fuel cell stack shown in FIG. 3.

FIG. 8 is an alternative enlarged cross-sectional view along line A-A through the solid oxide fuel cell component shown in FIG. 2.

DETAILED DESCRIPTION OF THE INVENTION

Figure 5:
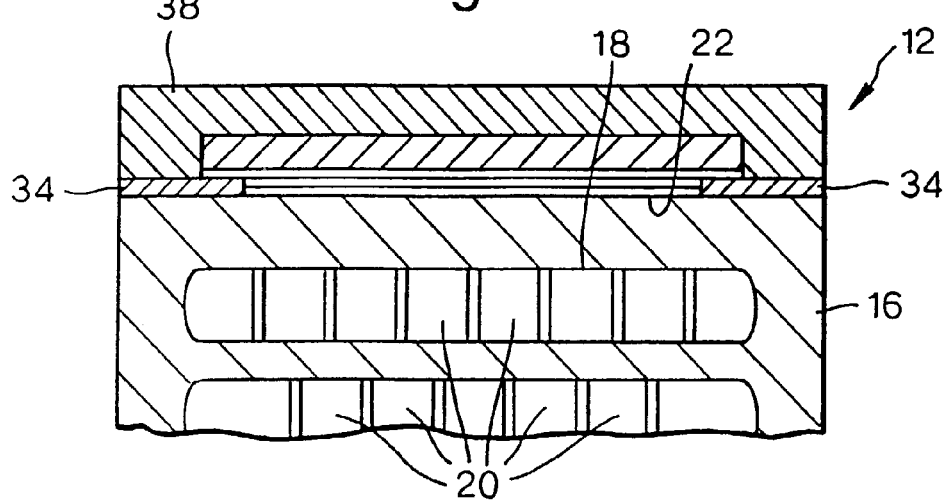
FIG. 5 is a cross-sectional view along line C-C through the solid oxide fuel cell component shown in FIG. 3.

A solid oxide fuel cell stack 10 according to the present invention is shown in FIGS. 1 to 5 and 7. The solid oxide fuel cell stack 10 comprises at least one, preferably a plurality of components 12 arranged within a casing 14. Each component 12, as shown more clearly in FIGS. 2 to 5, comprises a hollow porous gas permeable support structure 16 which has an internal surface 18 and an external surface 22. The internal surface 18 of the hollow porous gas permeable support structure 16 at least partially defines one or more chambers 20 for the supply of a first reactant to the internal surface 18 of the porous gas permeable support structure 16. The external surface 22 of the hollow porous gas permeable support structure 16 supports a plurality of solid oxide fuel cells 24 which are arranged in spaced apart relationship on the external surface 22 of the hollow porous gas permeable support structure 16. A second reactant is supplied to the external surface 22 of the hollow porous gas permeable support structure 16. The solid oxide fuel cells 24 are electrically interconnected in series.

Each solid oxide fuel cell 24, as shown more clearly in FIGS. 3, 4, 5 and 7 comprises a porous gas permeable first electrode 26, a dense non-porous gas tight electrolyte member 28 and a porous gas permeable second electrode 30. A plurality of dense non-porous gas tight interconnectors 32 are provided. At least one, all except two of the, dense non-porous gas tight interconnector 32 is arranged to interconnect the first electrode 26 of one solid oxide fuel cell 24 with the second electrode 30 of an adjacent solid oxide fuel cell 24. Each dense non-porous gas tight interconnector 32 is arranged on the external surface 22 of the porous gas permeable support structure 16, most of the dense non-porous gas tight interconnectors 32 are positioned in the space between two adjacent solid oxide fuel cells 24.

Referring to FIGS. 2 and 3, a dense non-porous gas tight interconnector 32A is arranged at a first end of the solid oxide fuel cell stack to interconnect the porous gas permeable first electrode 26 of one solid oxide fuel cell 24 with a first terminal 36. A dense non-porous gas tight interconnector 32B is arranged at a second end of the solid oxide fuel cell stack to interconnect the porous gas permeable second electrode 30 of one solid oxide fuel cell 24 with a second terminal 37.

The porous gas permeable first electrode 26 of each solid oxide fuel cell 24 is arranged on the external surface 22 of the porous gas permeable support structure 16, as shown in FIGS. 3, 4, 5 and 7.

A dense non-porous gas tight peripheral seal layer 34 is arranged on the external surface 22 of the porous gas permeable support structure 16 on the periphery of the area defined by the porous gas permeable first electrodes 26 and the dense non-porous gas tight interconnectors 32, 32A and 32B.

A first end 26A of each porous gas permeable first electrode 26 is arranged to contact one of the dense non-porous gas tight interconnectors 32. A second end 26B of each porous gas permeable first electrode 26 is arranged in spaced part relationship with an adjacent one of the dense non-porous gas tight interconnectors 32.

Each dense non-porous gas tight electrolyte 28 is arranged in contact with a corresponding one of the porous gas permeable first electrodes 26. A first end 28A of each dense non-porous gas tight electrolyte 28 is arranged in sealing contact with one of the dense non-porous gas tight interconnectors 32. A second end 28B of each dense non-porous gas tight electrolyte 28 is arranged between the second end 26B of the porous gas permeable first electrode 26 and the adjacent one of the dense non-porous gas tight interconnectors 32. The second end 28B of the dense non-porous gas tight electrolyte member 28 is in sealing contact with the external surface 22 of the porous gas permeable support structure 16. The second end 28B of each dense non-porous gas tight electrolyte 28 is also in sealing contact with the adjacent one of the dense non-porous gas tight interconnectors 32. The edges 28C and 28D of each dense non-porous gas tight electrolyte 28 are in sealing contact with the dense non-porous gas tight peripheral seal layer 34 to encapsulate the porous gas permeable first electrodes 26 to prevent gas leakage from the porous gas permeable first electrodes 26.

Each porous gas permeable second electrode 30 is arranged in contact with a corresponding one of the dense non-porous gas tight electrolytes 28. A first end 30A of each porous gas permeable second electrode 30 is spaced from a second end 303 of an adjacent porous gas permeable second electrode 30. The second end 30B of each porous gas permeable second electrode 30 is arranged in contact with the adjacent one of the dense non-porous gas tight interconnectors 32.

It is to be noted that the second end 30B of the porous gas permeable second electrode 30 of each solid oxide fuel cell 24 is spaced from the dense non-porous gas tight electrolyte 28 of an adjacent solid oxide fuel cell 24 to prevent the formation of spurious solid oxide fuel cells.

A dense non-porous gas tight seal 38 is arranged between the porous gas permeable second electrodes 30 and is in sealing contact with a portion of the dense non-porous gas tight electrolytes 28 and the dense non-porous gas tight interconnectors 32. The dense non-porous gas tight seal 38 is also arranged around the periphery of the area defined by the porous gas permeable second electrodes 30 and is in sealing contact with the dense non-porous gas tight peripheral seal layer 34. Thus the porous gas permeable second electrodes 30 are encapsulated to prevent gas leakage from the porous gas permeable second electrodes 30.

The dense non-porous gas tight seal 38 penetrates into the edges of the porous gas permeable second electrodes 30 which contact the edges of the dense non-porous gas tight electrolyte 28 and the edges of the surface of the dense non-porous gas tight interconnector 32. The infiltration of the dense non-porous gas tight seal 38 into the edges of the porous gas permeable second electrodes 30 forms a further seal in the event of a leakage of gas from the porous gas permeable first electrodes 26 through the dense non-porous gas tight interconnectors 32.

The porous gas permeable support structure 16 preferably comprises magnesia doped magnesium aluminate, however calcia stabilised zirconia or other suitable ceramics may be used. The magnesium aluminate is preferred because it is cheaper and has lower density than calcia stabilised yttria, and additionally the magnesium aluminate has negligible ion conductivity. The magnesium aluminate is doped with magnesia to match the thermal expansion coefficient of the yttria stabilised zirconia electrolyte, thus the magnesia doped magnesium aluminate is produced by mixing 60-70 wt % magnesia and balance alumina. The calcia-stabilised zirconia must have a dopant level of greater than 16 mol % calcia to ensure the zirconia is fully stabilised, for example 7 wt % calcia. One advantage of calcia stabilised zirconia is that it has a thermal expansion coefficient matched to the dense non-porous gas tight electrolytes. The calcia stabilised zirconia does not react with the other components of the fuel cells during sintering and the calcia stabilised zirconia has a lower oxygen ion conductivity than yttria stabilised zirconia.

Each dense non-porous gas tight interconnector 32, 32A and 32B comprises three layers. The first layer 40, on the porous gas permeable support structure, is a dense non-porous gas tight barrier layer which is neither ionically conducting or electronically conducting and for example comprises yttria stabilised zirconia containing a dopant, for example 1-2 wt % silicate glass material or 0.02-4 wt % calcium chromate. The dopants reduce the oxygen ion conductivity and act as sintering aids. The second layer 42 is a bond coating for the third layer and for example comprises lanthanum chromite. The second layer improves the densification of the first layer and reduces the ionic conductivity of the first layer. The second layer is about 10 μm thick after sintering. The third layer 44 is electronically conducting and oxidation resistant and comprises nickel, platinum, palladium, ruthenium, silver or an alloy of any two or more of nickel, platinum, palladium, ruthenium and silver, for example an alloy of palladium and nickel or other suitable metal. The platinum is sintered into the lanthanum chromite such that about 50% of the surface area of the interconnector is platinum and about 50% is lanthanum chromite.

Alternatively each interconnector 32, 32A, 32B comprises a first layer, on the porous gas permeable support structure, and a second layer on the first layer. The first layer is dense non-porous gas tight and is electronically and ionically non-conducting and the second layer is electronically conducting.

Preferably the first layer comprises a ceramic and the second layer comprises a metal. Preferably the metal comprises nickel, platinum, palladium, ruthenium, silver or an alloy of any two or more of nickel, platinum, palladium, ruthenium and silver, for example an alloy of 80 wt % palladium and 20 wt % nickel or other oxidation resistant metal.

The first layer 40 of the interconnectors 32, 32A and 32B may be deposited in two layers such that the yttria stabilised zirconia and dopants firstly fills the pores in the hollow porous gas permeable support structure 16 and then produces a smooth pore free surface.

The dense non-porous gas tight peripheral seal layer 34 is a dense non-porous gas tight barrier layer which is neither ionically conducting or electronically conducting and for example comprises yttria stabilised zirconia containing a dopant, for example 1-2 wt % silicate glass material or 0.02-4 wt % calcium chromate. The dopants reduce oxygen ionic conductivity and act as sintering aids. The dense non-porous gas tight barrier peripheral seal 34 may be deposited in two layers such that the yttria stabilised zirconia firstly fills the pores in the hollow porous gas permeable support structure 16 and then produces a smooth pore free surface.

The first electrode, anode, 26 comprises 60 wt % nickel oxide and 40 wt % yttria stabilised zirconia. The yttria-stabilised zirconia comprises 8 wt % yttria. The sintered anode thickness is about 30 μm. If the hollow porous gas permeable support structure 16 comprises magnesia doped magnesium aluminate a barrier layer is deposited on to the hollow porous gas permeable support structure 16 before the first electrode 26, because the nickel oxide reacts with the alumina in the magnesium aluminate. The barrier layer must layer prevent this reaction occurring and must be porous to allow reactants to flow to and from the anode 26. Preferably the barrier layer comprises 8 wt % yttria stabilised zirconia.

Alternatively the porous gas permeable first electrode, anode, 26 comprises nickel, palladium and ceria. The porous gas permeable first electrode 26 may comprise ceria, a ceria/nickel or palladium cermet, or ceria with an electronic conducting current distribution mesh of nickel or palladium or nickel/palladium alloy.

The dense non-porous gas tight electrolytes 28 comprise 8 wt % yttria stabilised zirconia and an oxide to aid sintering. The oxide may be 1 wt % alumina, 1 mol % alumina and 1 mol % titania, 5 mol % titania, 1 wt % nickel oxide or 0.25 wt % boron oxide. The dense non-porous gas tight electrolytes 28 have a density of greater than 98%. The electrolytes 28 may comprise yttria stabilised zirconia with two different particle sizes, for example an average particle size of about 0.7 micrometers and an average particle size of about 0.1 micrometers to enable good sintering to obtain maximum density without shrinkage and delamination of the electrolytes 28. The thickness of the dense non-porous gas tight electrolytes 28 is about 10 μm.

The porous gas permeable second electrode, cathode electrode, 30 comprises a first layer and a second layer. The first layer comprises 50 wt % 8 wt % yttria stabilised zirconia and 50 wt % lanthanum strontium manganite ($La_{0.8}Sr_{0.15}MnO_3$). The mixture of yttria stabilised zirconia and lanthanum strontium manganite provides enhanced oxygen ion conductivity for the first layer, increasing the effective area of the porous gas permeable second electrode 30/dense non-porous gas tight electrolyte 28 interface. This improves oxygen reduction kinetics, reducing the cathode polarisation loss. The first layer is between 5 and 15 μm thick. The second layer comprises 100 wt % lanthanum strontium manganite having a larger particle size than the first layer. The second layer improves the electronic conductance of the second electrode 30. The larger particle size improves the lateral conductivity and sintering characteristics to produce a porous crack free second electrode 30. The second layer is between 50 and 150 μm thick. The porous gas permeable second, cathode, electrode 30 may comprise lanthanum strontium manganite/ceria composite.

The dense non-porous gas tight seal 38 comprises a glass ceramic for example a barium oxide silica alumina based glass material which contains zircon which forms a glass ceramic film. Other suitable glass ceramics may be used.

The terminals 36 and 37 comprise nickel aluminide, and are formed by placing an aluminium layer on the substrate 16 and placing a nickel 1 ug in contact with the aluminium layer. The aluminium and nickel react at the sintering temperature to form nickel aluminide to bond the terminal 36, 37 to the 1 ug and the interconnector 32A, 32B. Alternatively the terminals 36 and 37 comprise 80 wt % palladium and 20 wt % nickel.

The solid oxide fuel cell component is manufactured by forming the porous gas permeable support structure 16 by producing a ceramic dough of the calcia stabilised zirconia, or magnesia doped magnesium aluminate, by mixing powdered ceramic with an aqueous organic matrix.

The ceramic dough is then passed through a ram extruder using a die to produce the porous gas permeable support structure shown in FIGS. 3, 4 and 5 although other shapes may be produced. After extrusion the porous gas permeable support structure 16 is dried for a suitable period of time. Microwave or others suitable drying may be used to accelerate the drying process.

The dried porous gas permeable support structure 16 is machined by cutting, grinding, milling, linishing and drilling using conventional tools. The machining is used to form manifolds, or interconnections, at the ends of the porous gas permeable support structure 16. The ends of the porous gas permeable support structure 16 may be sealed with a cap of the dried extruded ceramic dough and or a paste of the ceramic dough and dried.

The porous gas permeable support structure 16 is then sintered in a furnace on zirconia balls, which allow movement of the porous gas permeable support structure 16. The porous gas permeable support structure is sintered at a temperature of 1400° C. for a suitable time, for example two hours, to allow the temperature of the porous gas permeable support structure 16 to become equal at all points. This enables uniform sintering of the porous gas permeable support structure 16.

Figure 6A:
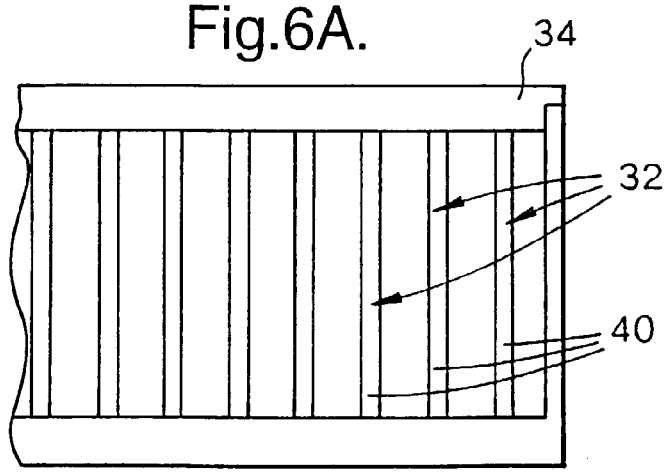
FIGS. 6A to 6E illustrate the manufacturing sequence for making the solid oxide fuel cell stack component shown in FIGS. 3 to 5.

A plurality of first layers 40 of dense non-porous barrier layer of the dense non-porous gas tight interconnectors 32 and the dense non-porous gas tight peripheral seal layer 34 are deposited on the porous gas permeable support structure 16, as shown in FIG. 6A. Initially a base coat of calcia stabilised zirconia, or other suitable ceramic, is applied by dip coating to fill in the porosity of the porous gas permeable support structure 16, the calcia stabilised zirconia has a particle size less than 2 μm and is applied as a water based slurry. The base coat is then fired at 1400° C. for 1 hour. Then the topcoat is applied by screen-printing using a common screen, the topcoat is yttria-stabilised zirconia comprising a dopant as discussed previously.

Figure 6B:
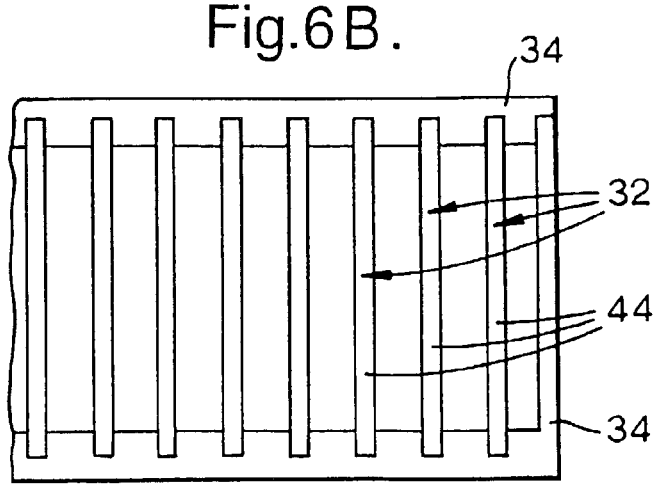

A plurality of second layers 42 and third layers 44 of the dense non-porous gas tight interconnectors 32 are deposited on the first layers 40 of the dense non-porous gas tight interconnectors 32 as shown in FIG. 6B. The second layers 42 and third layers 44 overlap the dense non-porous gas tight peripheral seal layer 34. The second and third layers 42 and 44 of the dense non-porous gas tight interconnectors 32 are deposited by screen-printing.

Figure 6C:
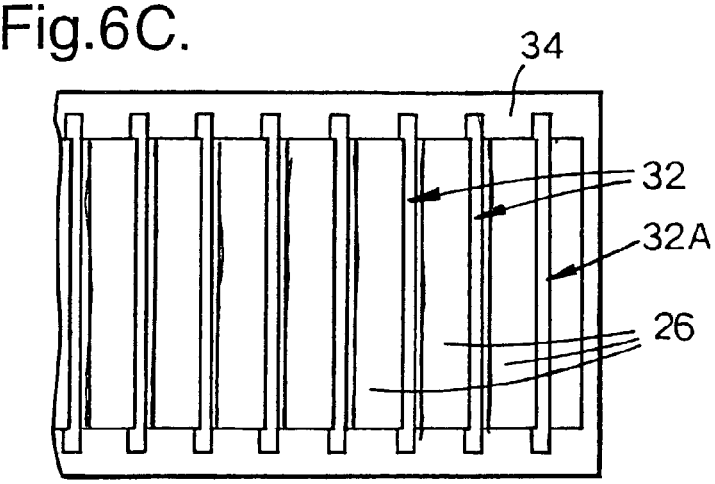

A plurality of porous gas permeable first electrodes 26 are deposited on the porous gas permeable support structure 16. The porous gas permeable first electrodes 26 overlap one of the adjacent dense non-porous gas tight interconnectors 32 but are spaced from the other of the adjacent dense non-porous gas tight interconnectors 32, as shown in FIG. 6C. The porous gas permeable first electrodes 26 are deposited by screen-printing.

Figure 6D:
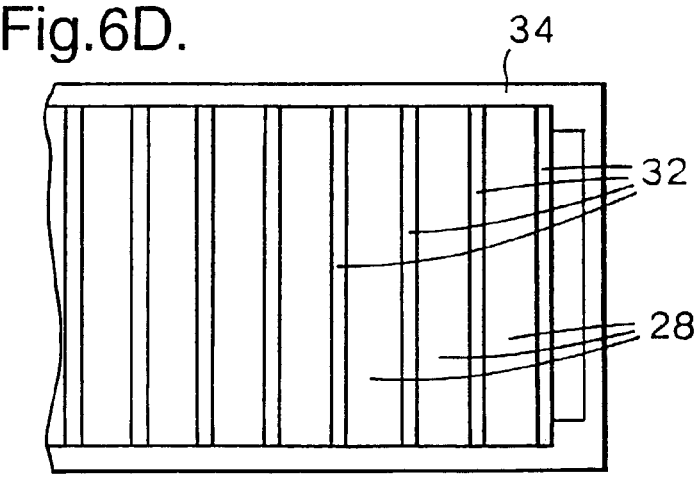

A plurality of dense non-porous gas tight electrolytes 28 are deposited on the porous gas permeable first electrodes 26 such that the dense non-porous gas tight interconnectors 32, the dense non-porous gas tight peripheral seal layer 34 and the dense non-porous gas tight electrolytes 28 are arranged to encapsulate all of the porous gas permeable first electrodes 26, as shown in FIG. 6D, except for the surface of the porous gas permeable first electrodes 26 in contact with the surface of the porous gas permeable support structure 16 to reduce, preferably prevent, leakage of reactant from the porous gas permeable first electrodes 26. The dense non-porous gas tight electrolytes 28 overlap the dense non-porous gas tight peripheral seal layer 34. Each dense non-porous gas tight electrolyte 28 overlaps one dense non-porous gas tight interconnector 32 and abuts the other dense non-porous gas tight interconnector 32. The dense non-porous gas tight electrolytes 28 are deposited by screen-printing. The electrolytes 28 may be deposited by depositing a layer comprising yttria stabilised zirconia particles with the average particle size of about 0.7 micrometers which produces 98% density. A second layer may be deposited by depositing a mixture of yttria stabilised zirconia particles with an average particle size of 0.7 micrometers and yttria stabilised zirconia particles with an average particle size of 0.1 micrometers.

Figure 6E:
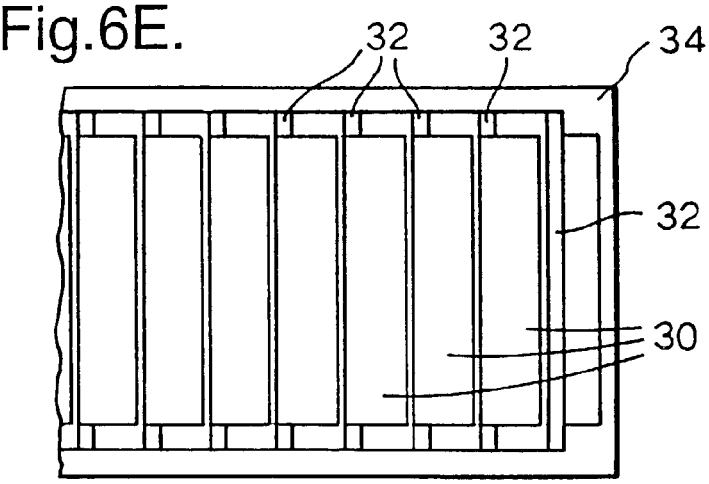
Figure 7:
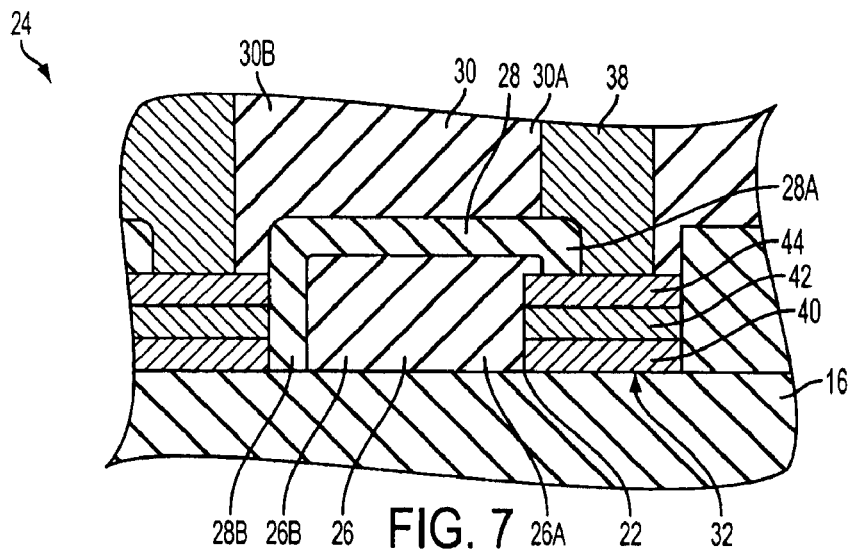
FIG. 7 is a further enlarged cross-sectional view through the solid oxide fuel cell component shown in FIG. 3.

A plurality of porous gas permeable second electrodes 30 are deposited on the plurality of dense non-porous gas tight electrolytes 28, as shown in FIG. 6E. The porous gas permeable second electrodes 30 overlap the dense non-porous gas tight interconnectors 32. The porous gas permeable second electrode 30 of each solid oxide fuel cell is spaced from the dense non-porous gas tight electrolyte 28 of an adjacent solid oxide fuel cell to prevent the formation of spurious solid oxide fuel cells. The porous gas permeable second electrodes 30 are deposited by stencil printing, or slurry spraying, to minimise damage to the underlying dense non-porous gas tight electrolytes 28.

The dense non-porous gas tight seal 38 is deposited around the plurality of porous gas permeable second electrodes 30 such that the dense non-porous gas tight electrolytes 28 and the dense non-porous gas tight seal layer 38 encapsulates all the porous gas permeable second electrodes 30 except for the surfaces of the porous gas permeable second electrodes 30 remote from the dense non-porous gas tight electrolytes 28. This reduces, preferably prevents, leakage of second reactant from the porous gas permeable second electrodes 30 to the porous gas permeable first electrodes 26 and reduces, preferably prevents, leakage of first reactant from the porous gas permeable first electrodes 26 to the porous gas permeable second electrodes 30. The dense non-porous gas tight seal 38 is deposited by screen-printing.

There may be a sintering step after the dense non-porous gas tight peripheral seal layer 34, dense non-porous gas tight interconnectors 32, porous gas permeable first electrodes 26 and dense non-porous gas tight electrolytes 28 have been deposited. There may be a further sintering step after the porous gas permeable second electrodes 30 and dense non-porous seal 38 has been deposited.

Alternatively there may be a sintering step after the dense non-porous gas tight peripheral seal layer 34 and dense non-porous gas tight interconnectors 32 have been deposited.

There may be a further sintering step after the porous gas permeable first electrodes 26 and dense non-porous gas tight electrolytes 28 have been deposited and a further sintering step after the porous gas permeable second electrodes 30 and dense non-porous gas tight seal 38 has been deposited.

Alternatively there may be a sintering step after each one of the dense non-porous gas tight peripheral seal layer 34, the dense non-porous gas tight interconnectors 32, the porous gas permeable first electrodes 26, the dense non-porous gas tight electrolytes 28, the porous gas permeable second electrodes 30 and the dense non-porous gas tight seal 38 has been deposited.

The sintering steps comprise heating to temperatures between 1000° C. and 1500° C. The interconnectors 32 are sintered at a temperature in the range 1300° C. to 1500° C., the anode electrodes 26 and electrolytes 28 are sintered at a temperature in the range the 1400° C. to 1450° C. and the cathode electrodes 30 are sintered at a temperature in the range 1000° C. to 1400° C.

The arrangement allows the dense non-porous gas tight interconnectors 32 and dense non-porous gas tight peripheral seal layer 34 to be sintered at high temperatures to make them dense, non-porous and gas tight without unwanted chemical reactions with other layers. Thus the sintering temperature is reduced as each layer is deposited.

It is to be noted that the porous gas permeable support structure 16 has two parallel planar surfaces and that one or both of the planar surfaces may be provided with solid oxide fuel cells.

Figure 9:
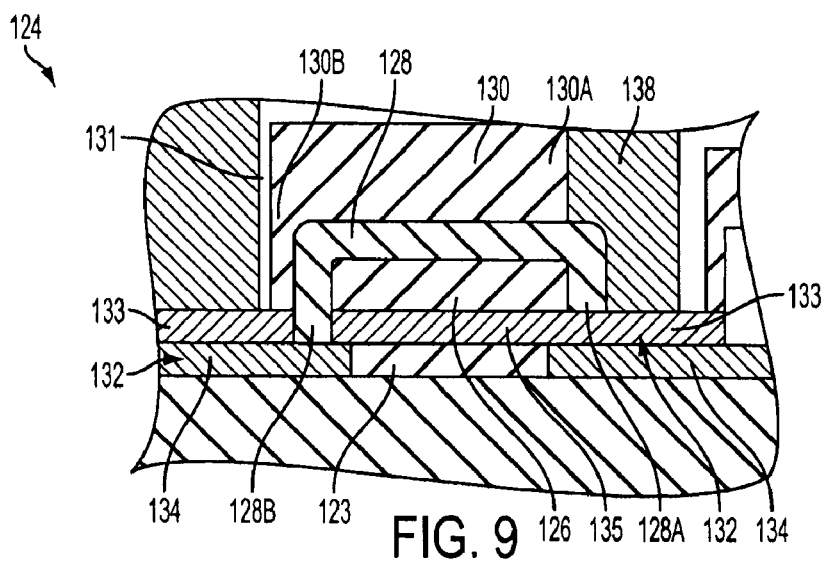
FIG. 9 is a further enlarged cross-sectional view through the solid oxide fuel cell component shown in FIG. 8.

A cross-section through an alternative solid oxide fuel cell component 112, is shown more clearly in FIGS. 8 and 9. The component 112 comprises a hollow porous gas permeable support structure 116, which has an internal surface 118 and an external surface 122. The internal surface 118 of the hollow porous gas permeable support structure 116 at least partially defines one or more chambers 120 for the supply of a first reactant to the internal surface 118 of the porous gas permeable support structure 116. The external surface 122 of the hollow porous gas permeable support structure 116 supports a plurality of solid oxide fuel cells 124 which are arranged in spaced apart relationship on the external surface 122 of the hollow porous gas permeable support structure 116. A second reactant is supplied to the external surface 122 of the hollow porous gas permeable support structure 16. The solid oxide fuel cells 124 are electrically interconnected in series.

Each solid oxide fuel cell 124 comprises a porous gas permeable first electrode 126, a dense non-porous gas tight electrolyte member 128 and a porous gas permeable second electrode 130. A plurality of dense non-porous gas tight interconnectors 132 are provided. At least one, all except two of the, dense non-porous gas tight interconnector 132 is arranged to interconnect the porous gas permeable first electrode 126 of one solid oxide fuel cell 124 with the porous gas permeable second electrode 130 of an adjacent solid oxide fuel cell 124.

The porous gas permeable first electrode 126 of each solid oxide fuel cell 124 is arranged on a respective one of a plurality of porous gas permeable current collectors 135. Each porous gas permeable current collector 135 is arranged on a respective one of a plurality of porous gas permeable barrier layers 123. Each dense non-porous gas tight interconnector 132 comprises a dense non-porous gas tight barrier layer 134 on the surface 122 of the porous gas permeable support structure 116 and an electronically conducting and oxidation resistant layer 133 on the dense non-porous gas tight barrier layer 134. The dense non-porous gas tight barrier layer 134 and the porous gas permeable barrier layer 123 prevent chemical interactions between the porous gas permeable first electrode 126 and the porous gas permeable support structure 116. Most of the dense non-porous gas tight interconnectors 132 are positioned in the space between two adjacent solid oxide fuel cells 124. A dense non-porous gas tight interconnector 132A is arranged at one end of the solid oxide fuel cell component to interconnect the porous gas permeable first electrode 126 of one solid oxide fuel cell 124 with a first terminal 36. A dense non-porous gas tight interconnector 132B is arranged at one end of the solid oxide fuel cell component to interconnect the porous gas permeable second electrode 130 of one solid oxide fuel cell 124 with a second terminal 37.

The dense non-porous gas tight peripheral seal layer 134 is arranged on the external surface 122 of the porous gas permeable support structure 116 on the periphery of the area defined by the porous barrier layer 123.

The whole of one surface, the surface remote from the dense non-porous gas tight electrolyte member 128, of each porous gas permeable first electrode 126 is arranged to contact the respective current collector 135.

Each dense non-porous gas tight electrolyte 128 is arranged in contact with a corresponding one of the porous gas permeable first electrodes 126. A first end 128A of each dense non-porous gas tight electrolyte 128 is arranged in sealing contact with the dense non-porous barrier layer 134 of a dense non-porous gas tight interconnector 132. A second end 128B of each dense non-porous gas tight electrolyte 128 is arranged in sealing contact with layer 133 of the respective dense non-porous gas tight interconnector 132. The edges 128C and 128D of each dense non-porous gas tight electrolyte 128 are in sealing contact with the dense non-porous gas tight peripheral seal layer 134 to encapsulate the porous gas permeable first electrodes 126 to prevent gas leakage from the porous gas permeable first electrodes 126.

Each porous gas permeable second electrode 130 is arranged in contact with a corresponding one of the dense non-porous gas tight electrolytes 128. A first end 130A of each porous gas permeable second electrode 130 is spaced from a second end 130B of an adjacent porous gas permeable second electrode 130. The second end 130B of each porous gas permeable second electrode 130 is arranged in contact with the adjacent one of the interconnectors 132. The second end 130B of each porous gas permeable second electrode 130 is spaced from the dense non-porous gas tight electrolyte 128 of an adjacent fuel cell 124 to prevent the formation of spurious solid oxide fuel cells.

A dense non-porous gas tight seal 138 is arranged between the porous gas permeable second electrodes 130 and is in sealing contact with a portion of the dense non-porous gas tight electrolytes 128. The dense non-porous gas tight seal 138 is also arranged around the periphery of the area defined by the porous gas permeable second electrodes 130 and is in sealing contact with the dense non-porous gas tight peripheral seal layer 134. The dense non-porous gas tight peripheral seal layer 134 is also in sealing contact with the interconnectors 132. Thus the porous gas permeable second electrodes 130 are encapsulated to prevent gas leakage from the porous gas permeable second electrodes 130.

The dense non-porous gas tight seal 138 penetrates into the edges of the porous gas permeable second electrodes 130, which contact the edges of the dense non-porous gas tight electrolyte member 128, and the surface of layer 133 of the dense non-porous gas tight interconnectors 132 that is not contacted by the dense non-porous gas tight electrolyte member 128 and not contacted by the porous gas permeable second electrodes 130. The infiltration of the dense non-porous gas tight seal 138 into the edges of the porous gas permeable second electrodes 130 forms a further seal in the event of a leakage of gas from the porous gas permeable first electrodes 126 through the dense non-porous gas tight interconnectors 132.

This arrangement is produced by firstly depositing the porous gas tight barrier layer 123 and the dense non-porous gas tight peripheral barrier layer 134. Then secondly the layer 133 of the interconnectors 132 and current collectors 135 are deposited and the assembly is sintered at high temperatures so as to prevent subsequent chemical reactions. Then the porous gas permeable first electrodes 126 are deposited, followed by the dense non-porous gas tight electrolyte members 128, followed by the porous gas permeable second electrodes 130 and finally the dense non-porous gas tight seal 138.

It is to be noted that the current collectors 135 and layers 133 of the interconnectors 132 are integral and are arranged between the porous gas permeable first electrodes 126 and the porous gas permeable support structure 116. The current collectors 135 are porous and gas permeable to allow the first reactant to flow from the porous gas permeable support structure 116 to the porous gas permeable first electrodes 126. The current collectors 135 collect current from/supply current to the first porous gas permeable first electrodes 126. The current collectors 135 and layers 133 of the interconnectors 132 have high lateral, in plane, conductivity. However, it is to be noted that the current collectors 135 and layers 133 of the interconnectors 132 are relatively thin, of the order of a few micrometers thick. The length of the current collector 135 and layer 133 of the interconnector 132 is relatively long, of the order of several mm long. Thus any leakage path is long and narrow and leakage is minimal or substantially zero. For example each fuel cell is about 15 mm long and about 0.030 mm thick, the current collector 135 and layer 133 of the interconnector 132 is almost 15 mm long and about 1 micrometer thick. Thus the layer 133 of the interconnector 132 is substantially gas tight for flow in a lateral direction.

The current collectors 135 and layers 133 of the interconnectors 132 comprise at least one of nickel, platinum, palladium, ruthenium and silver, preferably two or more of these, for example nickel and platinum or nickel and palladium, nickel and ruthenium etc. The interconnectors 132 also comprise yttria-stabilised zirconia to aid bonding of the interconnector 132 to the porous barrier layer 123 and dense non-porous gas tight barrier layer 134.

A porous gas permeable current collector 131 is arranged on the porous gas permeable second electrode 130 to collect current from/supply current to the second porous gas permeable second electrodes 130. The current collectors 131 have high lateral, in plane, conductivity. The current collectors 131 comprise a high conductivity metal or alloy for example one or more of nickel and silver and one or more of platinum, palladium ruthenium and gold, for example nickel and platinum, nickel and palladium, nickel and ruthenium etc. The current collector 131 is deposited by screen printing and doctor blading and is about 10 micrometers thick.

In this example the first electrodes 26 are anode electrodes and the second electrodes 30 are cathode electrodes.

Figure 11:
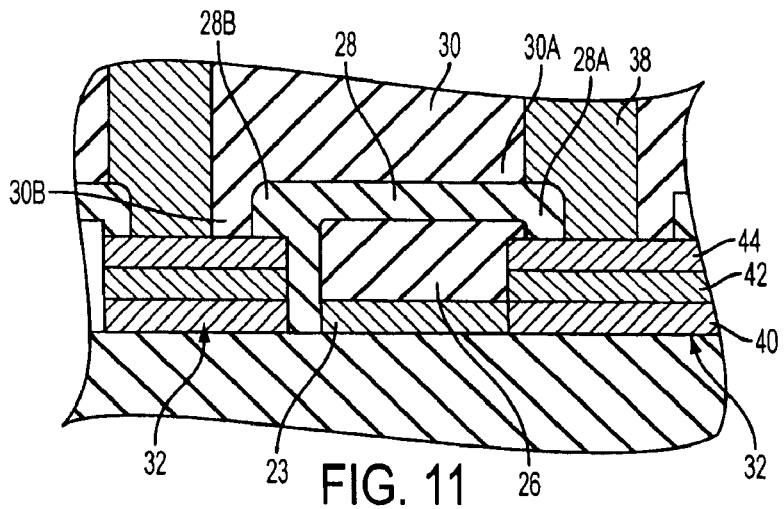
FIG. 11 is a further enlarged cross-sectional view through the solid oxide fuel cell component shown in FIG. 10.
Figure 10:
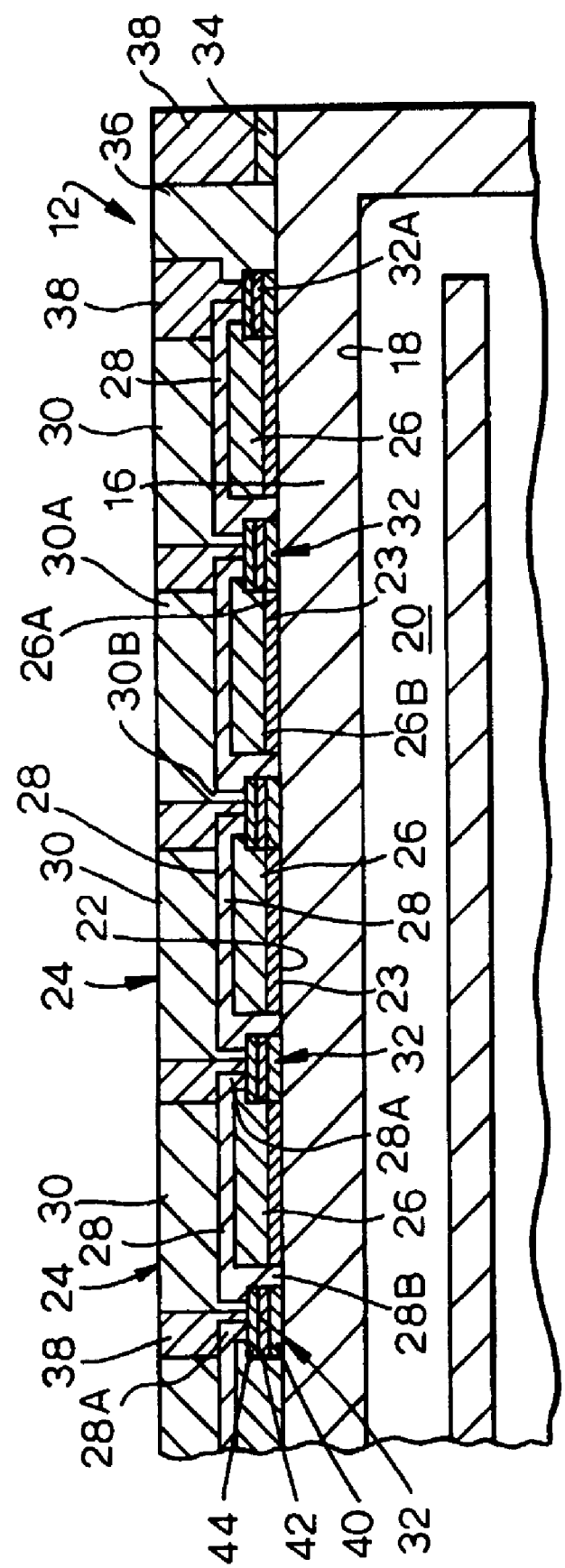
FIG. 10 is a further enlarged cross-sectional view along line A-A through the solid oxide fuel cell component shown in FIG. 2.

A cross-section through an alternative solid oxide fuel cell component 212, is shown more clearly in FIGS. 10 and 11. The component 212 is substantially the same as that shown in FIGS. 3, 4, 5 and 7 and like parts are denoted by like numerals. The component 212 in FIGS. 10 and 11 differs in that the second end 28B of each dense non-porous gas tight electrolyte member 28 abuts and overlaps the adjacent dense non-porous gas tight interconnector 32. Additionally porous barrier layers 123 are arranged between each porous gas permeable first, anode, electrode 26 and the porous gas permeable support structure 16 to prevent chemical interactions between the porous gas permeable anode electrodes 26 and the porous gas permeable support structure 16.

It may be possible to deposit a porous gas permeable barrier layer over the whole surface of the porous gas permeable support structure to prevent chemical interactions between the porous gas permeable support structure and the porous gas permeable first electrodes. A dense non-porous gas tight barrier layers is subsequently provided at appropriate positions over the porous gas permeable barrier layer for the interconnectors. The dense non-porous gas tight peripheral seal is provided over the remaining surface of the porous gas permeable support structure.

The prevention of the leakage of the reactant from the first electrodes to the second electrodes is very important because otherwise the reactants, hydrogen and oxygen, would mix and burn and lead to damage and loss of performance of the fuel cells.

Although the invention has been described with reference to a dense non-porous gas tight seal around the second electrodes it may in some circumstances be possible to dispense with the dense non-porous gas tight seal if the encapsulation of first electrodes is completely prevented.

Although the invention has been described the first electrodes as anode electrodes it may be possible that the first electrodes are cathode electrodes.

The reactant supplied to the anode is generally hydrogen or the products of reformation of a hydrocarbon fuel, for example hydrogen, carbon dioxide, carbon monoxide. The reactant supplied to the cathode is generally oxygen, air or other oxygen containing gas.

The arrangement of the fuel cells enables the dense non-porous gas tight layers to be deposited initially and fired at the highest temperatures to obtain the sintering to form the dense non-porous gas tight layers. The other layers are deposited and fired at progressively lower temperatures. This enables the solid oxide fuel cells to operate at temperatures up to 1200° C.

The length and thickness of the layers of the solid oxide fuel cell stack are important design variables and influence the solid oxide fuel cell stack performance. Current collection losses are minimised by minimising the length of any current path. This is achieved by minimising the pitch of the solid oxide fuel cells. The pitch of the solid oxide fuel cells is length of the electrolyte member plus the length of the interconnector. Resistance to flow of current is minimised by minimising the number of interfaces. These conflicting requirements result in an optimum solid oxide fuel cell pitch, the magnitude of which depends upon the thickness and conductivity of the anode and cathode current collectors. The pitch of solid oxide fuel cell is between 5 mm and 20 mm.

The electrolyte member/interconnector aspect ratio, the ratio of the length of the electrolyte member to the length of the interconnector, should be maximised. This is because the longer the interconnector, the more expensive material is contained in the solid oxide fuel cell stack and the longer the support structure becomes the power density is reduced. Maximising the aspect ratio maximises the current density through the interconnectors. This makes the solid oxide fuel cell stack performance sensitive to electrode-interconnector contact resistance and to interconnector conductivity. An electrolyte member to interconnector aspect ratio of about 3 to 1 is used.

The invention claimed is:

1. A solid oxide fuel cell component comprising:
a porous gas permeable support structure having a surface;
at least first, second and third solid oxide fuel cells being arranged in spaced apart relationship on the surface of the porous gas permeable support structure, such that the first cell is adjacent to the second cell, the second cell is adjacent to the third cell, and the cells are arranged in electrical series;
the first, second and third cells each comprising a dense non-porous gas tight electrolyte member, a porous gas permeable anode, and a porous gas permeable cathode;
the anode of the first cell being connected to the cathode of the adjacent second cell by a first dense non-porous and gas tight interconnector;
the first interconnector having a bottom surface contacting the surface of the support, a first side surface contacting the anode of the first cell, a top surface, and a second side surface spaced apart from the anode of the second cell;
the anode of the first cell contacting a portion of the top surface of the first interconnector and the cathode of the second cell contacting another portion of the top surface of the first interconnector;
the anode of the second cell being connected to the cathode of the adjacent third cell by a second dense non-porous and gas tight interconnector;
the second interconnector having a bottom surface contacting the surface of the support, a first side surface contacting the anode of the second cell, a top surface, and a second side surface spaced apart from the anode of the third cell;
the anode of the second cell contacting a portion of the top surface of the second interconnector and the cathode of the third cell contacting another portion of the top surface of the second interconnector; and
the electrolyte member of the second cell being arranged between the anode and cathode of the second cell, a first end of the electrolyte member of the second cell contacting the surface of the support between the second side surface of the first interconnector and a side surface of the anode of the second cell, a second end of the electrolyte member of the second cell contacting the top surface of the second interconnector between the anode of the second cell and the cathode of the third cell, and the electrolyte member of the second cell is spaced apart from the cathode of the third cell by a portion of the top surface of the second interconnector.

2. A solid oxide fuel cell component as claimed in claim 1, further comprising a dense non-porous gas tight peripheral seal member covering at least a portion of the surface of the support structure not covered by the anodes, the interconnectors and the electrolyte members.

3. A solid oxide fuel cell component as claimed in claim 1, further comprising a dense non-porous gas tight seal comprising a seal layer filling an area defined by a side surface of the electrolyte member of the second cell, a side surface of the cathode of the second cell, a side surface of the cathode of the third cell, and the top surface of the second interconnector to reduce leakage of reactant.

4. A solid oxide fuel cell component as claimed in claim 3 wherein the electrolyte member of the second cell and the dense non-porous gas tight seal are arrange to encapsulate the cathode of the second cell except for surfaces of the cathode remote from the electrolyte member of the second cell to reduce leakage of reactant from the cathode.

5. A solid oxide fuel cell component as claimed in claim 1 wherein each of the anodes is arranged in contact with the surface of a current collector, each current collector being arranged in contact with a porous barrier layer, the porous barrier layer being arranged in contact with the surface of the porous gas permeable support structure.

6. A solid oxide fuel cell component as claimed in claim 1, wherein the first, second and third interconnectors each comprises a first layer on the porous gas permeable support structure, a second layer on the first layer, and a third layer on the second layer, the first layer is dense, non-porous gas tight and is electronically and ionically non-conducting, the second layer bonds the third layer to the first layer and the third layer is electronically conducting.

7. A solid oxide fuel cell component as claimed in claim 6 wherein the first layer comprises a ceramic, the second layer comprises lanthanum chromite and the third layer comprises a metal.

8. A solid oxide fuel cell component as claimed in claim 6 wherein the third layer comprises nickel, platinum, palladium, ruthenium and silver.

9. A solid oxide fuel cell component as claimed in claim 6 wherein the first layer comprises yttria stabilized zirconia doped with silicate glass or yttria stabilized zirconia doped with calcium chromate.

10. A solid oxide fuel cell component as claimed in claim 1, wherein the first, second and third interconnectors each comprises a first layer on the porous gas permeable support structure and a second layer on the first layer, the first layer is dense non-porous and is electronically and ionically nonconducting and the second layer is electronically conducting.

11. A solid oxide fuel cell component as claimed in claim 10 wherein the first layer comprises a ceramic and the second layer comprises a metal.

12. A solid oxide fuel cell component as claimed in claim 10 wherein the second layer comprises nickel, platinum, palladium, ruthenium, silver.

13. A solid oxide fuel cell component is claimed in claim 10 wherein the first layer comprises yttria stabilized zirconia.

14. A solid oxide fuel cell component as claimed in claim 13 to wherein the first layer comprises yttria stabilized zirconia doped with silicate glass or yttria stabilized zirconia doped with calcium chromate.

15. A solid oxide fuel cell component as claimed in claim 5 wherein an electronically conducting layer of each of the first, second and third interconnectors is integral with the current collector.

16. A solid oxide fuel cell component as claimed in claim 1 wherein a porous gas permeable barrier layer is arranged between each of the anodes and the surface of the porous gas permeable support structure to prevent chemical interactions between the anodes and the porous gas permeable support structure.

17. A solid oxide fuel cell component as claimed in claim 16, a dense non-porous gas tight peripheral seal extends around a periphery of an area defined by the anodes and the dense non-porous interconnectors.

18. A solid oxide fuel cell component as claimed in claim 17 wherein ends of at least one dense non-porous interconnector contacts a top surface of the dense non-porous gas tight peripheral seal.

19. A solid oxide fuel cell component as claimed in claim in 18 wherein edges of the dense non-porous gas tight electrolyte members contact a top surface of the dense non-porous gas tight peripheral seal.

20. A solid oxide fuel cell component as claimed in claim 16 wherein the dense non-porous gas tight peripheral seal comprises a first layer and a second layer.

21. A solid oxide fuel cell component as claimed in claim 20 wherein the dense non-porous gas tight peripheral seal comprises a ceramic.

22. A solid oxide fuel cell component as claimed in claim to 21 wherein the dense non-porous gas tight peripheral seal comprises yttria stabilized zirconia.

23. A solid oxide fuel cell component as claimed in claim 21 wherein the dense non-porous gas tight peripheral seal comprises yttria stabilized zirconia doped with silicate glass or yttria stabilized zirconia doped with calcium chromate.

24. A solid oxide fuel cell component as claimed in claim 1 further comprising a dense non-porous gas tight peripheral seal member covering at least a portion of the surface of the support structure not covered by the anodes, the interconnectors and the electrolyte members and a dense non-porous gas tight seal comprising a seal layer filling an area defined by a side surface of the electrolyte member of the second cell, a side surface of the cathode of the second cell, a side surface of the cathode of the third cell, and the top surface of the second interconnector, wherein the dense non-porous seal contacts a top surface of the dense non-porous gas tight peripheral seal.

25. A solid oxide fuel cell component as claimed in claim 24 wherein the dense non-porous seal contacts the top surface of the electrolyte member of the second cell.

26. A solid oxide fuel cell component as claimed in claim 3 wherein the dense non-porous gas tight seal comprises a glass ceramic material.

27. A solid oxide fuel cell component as claimed in claim 3 wherein the dense non-porous seal comprises a glass containing barium oxide, silica, alumina and zircon.

28. A solid oxide fuel cell component as claimed in claim 1 wherein a portion of the first end of the electrolyte member of the second cell contacting a top surface of the first interconnector.

29. A solid oxide fuel cell component as claimed in claim 28 wherein the first end of the electrolyte member of the second cell contacts the second side of the first interconnector.

30. A solid oxide fuel cell component as claimed in claim 6 wherein the third layer comprises an alloy of any two or more of nickel, platinum, palladium, ruthenium and silver.

31. A solid oxide fuel cell component as claimed in claim 10 wherein the second layer comprises an alloy of any two or more of nickel, platinum, palladium, ruthenium, and silver.

32. A solid oxide fuel cell component comprising:
a porous gas permeable support structure having a surface;
at least first, second and third solid oxide fuel cells being arranged in spaced apart relationship on the surface of the porous gas permeable support structure, such that the first cell is adjacent to the second cell, the second cell is adjacent to the third cell, and the cells are arranged in electrical series;
the first, second and third cells each comprising a dense non-porous gas tight electrolyte member, a porous gas permeable anode, and a porous gas permeable cathode;
the anode of the first cell being connected to the cathode of the adjacent second cell by a first dense non-porous and gas tight interconnector;
the first interconnector having a bottom surface contacting the surface of the support, a first side surface contacting the anode of the first cell, a top surface, and a second side surface spaced apart from the anode of the second cell;
the anode of the first cell contacting a portion of the top surface of the first interconnector and the cathode of the second cell contacting another portion of the top surface of the first interconnector;

the anode of the second cell being connected to the cathode of the adjacent third cell by a second dense non-porous and gas tight interconnector;

the second interconnector having a bottom surface contacting the surface of the support, a first side surface contacting the anode of the second cell, a top surface, and a second side surface spaced apart from the anode of the third cell;

the anode of the second cell contacting a portion of the top surface of the second interconnector and the cathode of the third cell contacting another portion of the top surface of the second interconnector;

the electrolyte member of the second cell being arranged between the anode and cathode of the second cell, a first end of the electrolyte member of the second cell contacting the surface of the support between the second side surface of the first interconnector and a side surface of the anode of the second cell, a second end of the electrolyte member of the second cell contacting the top surface of the second interconnector between the anode of the second cell and the cathode of the third cell, and the electrolyte member of the second cell is spaced apart from the cathode of the third cell by a portion of the top surface of the second interconnector; and a dense non-porous gas tight peripheral seal member comprising a seal layer located on the surface of the support structure on the periphery of the area defined by the anode of the second cell and the first and second interconnectors the dense non-porous gas tight peripheral seal member and the second electrolyte members arranged to encapsulate the second anode except for the bottom surface of the second anode facing the surface of the porous gas permeable support structure to reduce leakage of reactant from the second anode.

33. A solid oxide fuel cell component as claimed in claim 1 wherein a pitch of the solid oxide fuel cells is between 5 mm and 20 mm.

34. A solid oxide fuel cell component as claimed in claim 1 wherein the electrolyte member to interconnector aspect ratio is about 3 to 1, the electrolyte member to interconnector aspect ratio is the ratio of the length of the electrolyte member to the length of the interconnector.

35. A solid oxide fuel cell component as claimed in claim 2 wherein the dense non-porous gas tight peripheral seal comprises a first layer and a second layer.

36. A solid oxide fuel cell component as claimed in claim 2 wherein the dense non-porous gas tight peripheral seal comprises a ceramic.

37. A solid oxide fuel cell component as claimed in claim to 36 wherein the dense non-porous gas tight peripheral seal comprises yttria stabilized zirconia.

38. A solid oxide fuel cell component as claimed in claim 36 wherein the dense non-porous gas tight peripheral seal comprises yttria stabilized zirconia doped with silicate glass or yttria stabilized zirconia doped with calcium chromate.

39. A solid oxide fuel cell component comprising:
a porous gas permeable support structure having a surface;
at least first, second and third solid oxide fuel cells being arranged in spaced apart relationship on the surface of the porous gas permeable support structure, such that the first cell is adjacent to the second cell, the second cell is adjacent to the third cell, and the cells are arranged in electrical series;

the first, second and third cells each comprising a dense non-porous gas tight electrolyte member, a porous gas permeable anode, and a porous gas permeable cathode;

the anode of the first cell being connected to the cathode of the adjacent second cell by a first dense non-porous and gas tight interconnector;

the first interconnector having a bottom surface contacting the surface of the support, a first side surface contacting the anode of the first cell, a top surface, and a second side surface spaced apart from the anode of the second cell;

the anode of the first cell contacting a portion of the top surface of the first interconnector and the cathode of the second cell contacting another portion of the top surface of the first interconnector;

the anode of the second cell being connected to the cathode of the adjacent third cell by a second dense non-porous and gas tight interconnector;

the second interconnector having a bottom surface contacting the surface of the support, a first side surface contacting the anode of the second cell, a top surface, and a second side surface spaced apart from the anode of the third cell;

the anode of the second cell contacting a portion of the top surface of the second interconnector and the cathode of the third cell contacting another portion of the top surface of the second interconnector;

the electrolyte member of the second cell being arranged between the anode and cathode of the second cell, a first end of the electrolyte member of the second cell contacting the surface of the support between the second side surface of the first interconnector and a side surface of the anode of the second cell, a second end of the electrolyte member of the second cell contacting the top surface of the second interconnector between the anode of the second cell and the cathode of the third cell, and the electrolyte member of the second cell is spaced apart from the cathode of the third cell by a portion of the top surface of the second interconnector;

a dense non-porous gas tight seal comprising a seal layer filling an area defined by a side surface of the electrolyte member of the second cell, a side surface of the cathode of the second cell, a side surface of the cathode of the third cell, and the top surface of the second interconnector to reduce leakage of reactant; and a dense non-porous gas tight peripheral seal member covering at least a portion of the surface of the support structure not covered by the anodes, the interconnectors and the electrolyte members.

* * * * *